J. B. KLEIN.
CAR FENDER.
APPLICATION FILED SEPT. 20, 1915.

1,174,992.

Patented Mar. 14, 1916.

Inventor
John B. Klein,

Witness
Fred C. Fischer.
L. J. Fischer

By F. G. Fischer,
Attorney.

UNITED STATES PATENT OFFICE.

JOHN B. KLEIN, OF KANSAS CITY, KANSAS.

CAR-FENDER.

1,174,992.   Specification of Letters Patent.   Patented Mar. 14, 1916.

Application filed September 20, 1915. Serial No. 51,582.

*To all whom it may concern:*

Be it known that I, JOHN B. KLEIN, a citizen of the United States, residing at Kansas City, in the county of Wyandotte and State of Kansas, have invented certain new and useful Improvements in Car-Fenders, of which the following is a specification.

My invention relates to car fenders, and one object is to provide a fender particularly adapted for use on street and interurban electric cars.

A further object is to provide a fender which will readily pick up any person who might happen to be caught in front of a car.

Another object is to provide a fender, which on striking a person or obstruction on the track, will automatically stop the car by actuating the air brakes and cutting off the electric current to the motor.

Figure 1:
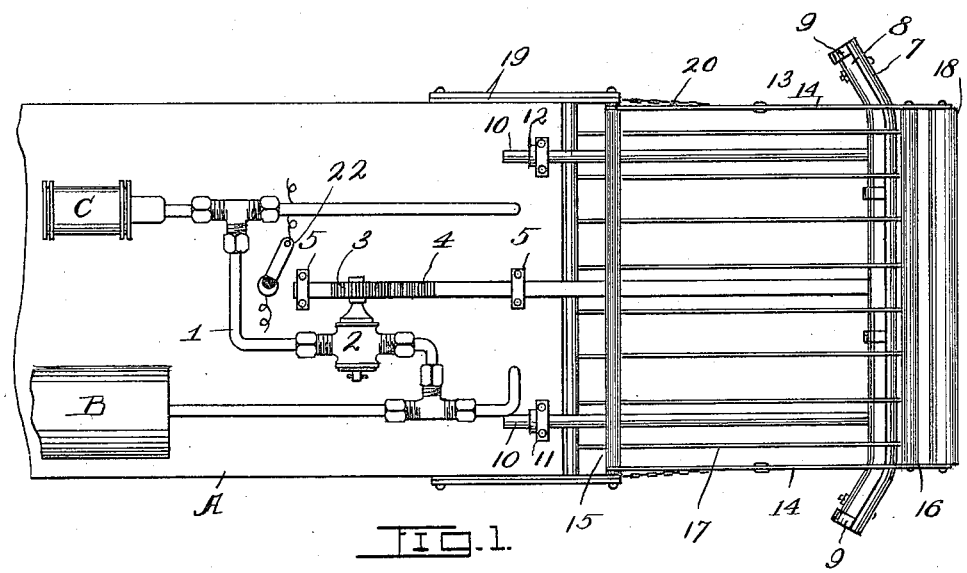
Figure 2:
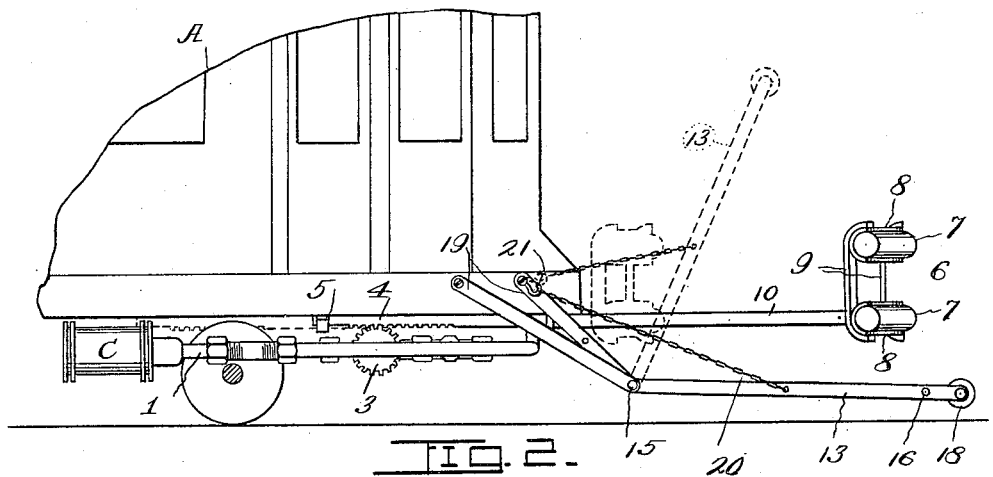

In order that the invention may be fully understood, reference will now be made to the accompanying drawing, in which:

Figure 1 is a broken, inverted, plan view of the front portion of a car provided with my fender. Fig. 2 is a side elevation of the parts disclosed by Fig. 1.

Referring now in detail to the various parts, A designates a car which is provided with the customary air brake mechanism embodying an auxiliary air cylinder B and a brake cylinder C, which latter communicates with the former through the intermediacy of pipe connections 1, through which the passage of air is controlled by a rotary valve 2, the stem of which has a pinion 3, fixedly-mounted thereon and intermeshing with a rack-bar 4, slidably arranged in guides 5 secured to the underside of the car. The rack-bar 4 extends forwardly beyond the car and is fixed to a transverse bumper 6, consisting of upper and lower cushions 7, metallic casing 8 in which said cushions are fixed, and vertical members 9 connecting said casings 8.

The rack-bar 4 is assisted in carrying the bumper 6 by a pair of oppositely-disposed arms 10, fixed at their forward ends to the lower casing 8 and extending rearwardly through a pair of guides 11, secured to the underside of the car. Forward movement of the bumper 6 is limited by collars 12 fastened to the rear portion of the arms 10 to contact the guides 11, and backward movement of said bumper 6 is restricted by abutting a pair of brackets 19, as disclosed by dotted lines, Fig. 2.

13 designates an apron extending forwardly beneath the bumper 6 to pick up any person caught on the track. Said apron 13 consists of a pair of forwardly-extending arms 14, transverse members 15 and 16 connecting the rear and front portions, respectively, of said arms 14, rods 17 paralleling the arms 14 and connected at their ends to the transverse members 15 and 16, and a roller 18 journaled in the forward ends of the arms 14. The rear ends of the arms 14 are pivotally-mounted upon the transverse member 15, so that the apron 13 may be folded to the dotted position, Fig. 2. The transverse member 15 is carried at the lower forward ends of the brackets 19, secured to the sides of the car near the front end thereof. The apron 13 is sustained when in lowered position by chains 20, secured at their forward ends to the arms 14 and adjustably secured at their rear ends to hooks 21, so that when the apron is folded said chains 20 may be taken up to support the apron in folded position.

22 designates a switch controlling the electric circuit to the car motor (not shown). Said switch is arranged in the path of the rack-bar 4, so that when the latter is shifted backward by the bumper 6 striking an object on the track, said rack-bar 4 will contact and open the switch 22, and thus cut off the current to the motor. When the rack-bar 4 moves backward, as above-referred to, it rotates the pinion 3, which in turn opens the valve 2 and permits compressed air to flow from the tank B to the brake cylinder C, which in turn locks the brakes (not shown) and thus automatically stops the car.

From the foregoing description, it is apparent that I have produced a car fender embodying all the features of advantage above-enumerated, and while I have shown and described the preferred form of my invention, I reserve the right to make such changes in the construction, arrangement and proportion of parts as properly fall within the spirit and scope of the claims.

Having thus described my invention, what I claim and desire to secure by Letters Patent, is:

1. In combination with a car and its air brake system, a slidable bumper, a pinion connected to the air brake valve, a rack bar rigidly connected to the bumper and meshed with said pinion, and a switch located beyond the inner end of the rack bar and normally spaced therefrom and adapted upon inward movement of the rack bar to be engaged and operated by the said inner end of the rack bar.

2. In combination with a car and its air brake system, brackets on the car, a horizontal fender supported by the brackets, a slidable bumper including spaced vertically alined upper and lower cushions, means to connect the cushions, means to support the bumper with its said cushions normally arranged between the front and rear of the fender and means connected to the bumper for setting the air brakes upon inward movement of the bumper, the inward movement of the bumper being restricted by said brackets.

3. In combination with a car and its air brake system, brackets on the car, a horizontal fender pivoted to the brackets, a slidable bumper normally disposed between the front and rear of the fender, and means controlled by the inward movement of the bumper to set the air brakes, said bumper having its inward movement restricted by said brackets, and said fender being foldable to extend vertically in front of the bumper.

In testimony whereof I affix my signature, in the presence of two witnesses.

JOHN B. KLEIN.

Witnesses:
F. G. FISCHER,
L. J. FISCHER.

Copies of this patent may be obtained for five cents each, by addressing the "Commissioner of Patents, Washington, D. C."